(12) United States Patent
Takeuchi et al.

(10) Patent No.: US 8,231,953 B2
(45) Date of Patent: Jul. 31, 2012

(54) TRANSPARENT PLASTIC CONTAINER FOR ANTICOUNTERFEIT SYSTEM

(75) Inventors: Itsuo Takeuchi, Yokohama (JP); Tokio Sakauchi, Yokohama (JP); Mutsumi Sasaki, Yokohama (JP); Tomoyoshi Sakamoto, Ota (JP); Masahiro Arai, Ota (JP); Rie Maejima, Ota (JP)

(73) Assignees: NHK Spring Co., Ltd., Yokohama-Shi (JP); RP Topla Limited, Suita-Shi (JP)

( * ) Notice: Subject to any disclaimer, the term of this patent is extended or adjusted under 35 U.S.C. 154(b) by 560 days.

(21) Appl. No.: 12/375,453

(22) PCT Filed: Jul. 11, 2007

(86) PCT No.: PCT/JP2007/063794
§ 371 (c)(1),
(2), (4) Date: May 13, 2009

(87) PCT Pub. No.: WO2008/038447
PCT Pub. Date: Apr. 3, 2008

(65) Prior Publication Data
US 2010/0015378 A1    Jan. 21, 2010

(30) Foreign Application Priority Data

Sep. 26, 2006    (JP) .................................. 2006-264219

(51) Int. Cl.
*B29D 22/00*    (2006.01)
*B29C 43/00*    (2006.01)
*B42D 15/00*    (2006.01)

(52) U.S. Cl. .......... 428/36.9; 264/544; 264/553; 283/72

(58) Field of Classification Search .................. 428/36.9; 283/72–91; 359/2; 206/308.2; 264/87; 220/377
See application file for complete search history.

(56) References Cited

U.S. PATENT DOCUMENTS

| 4,687,129 A | 8/1987 | Cugley |
| 5,033,774 A * | 7/1991 | Benardelli .................. 283/108 |
| 2002/0163179 A1* | 11/2002 | Dubner et al. .................. 283/72 |

(Continued)

FOREIGN PATENT DOCUMENTS

EP    0 666 224 A1    8/1995

(Continued)

OTHER PUBLICATIONS

BASF, Styrolux® Styrene-Butadiene Copolymer (SBC) Mechanical and Optical Properties, 2006.*

(Continued)

*Primary Examiner* — Rena Dye
*Assistant Examiner* — Susan R Dye
(74) *Attorney, Agent, or Firm* — Birch, Stewart, Kolasch & Birch, LLP (57) ABSTRACT

A transparent plastic container which is transparent, allows good design and can be used for an anticounterfeit system that determines authenticity by visual check with the use of polarization property. A transparent plastic sheet of a polystyrene-based resin having a total light transmission of 85% or higher and a haze of 7% or less is subjected to vacuum, pneumatic or vacuum/pneumatic forming at a sheet temperature ranging from a glass transition temperature plus 50 degrees C. to a glass transition temperature plus 130 degrees C., thereby obtaining a transparent plastic container having a planar portion with a strain amount of 150 nm or less.

6 Claims, 4 Drawing Sheets

U.S. PATENT DOCUMENTS

2005/0141846 A1   6/2005   Lai et al.

FOREIGN PATENT DOCUMENTS

| JP | 63-51193 A | 3/1988 |
| JP | 5-334477 A | 12/1993 |
| JP | 8-40460 A | 2/1996 |
| JP | 8-43804 A | 2/1996 |
| JP | 2001-39100 A | 2/2001 |
| JP | 2003-292708 A | 10/2003 |
| JP | 2005-91786 A | 4/2005 |
| WO | WO-00/13065 A1 | 3/2000 |

OTHER PUBLICATIONS

Extended European Search Report dated Aug. 10, 2010 for European Patent Apptcation No. 07 79 0598.

European Office Action dated May 25, 2011 for Application No. 07 790 598.2.

* cited by examiner

TRANSPARENT PLASTIC CONTAINER FOR ANTICOUNTERFEIT SYSTEM

TECHNICAL FIELD

The present invention relates to a transparent plastic container used for packaging an article such as a home electric appliance, an electronic component, a personal computer supply, an automobile part, a garment and an accessory, and a transparent plastic container corresponding to an anticounterfeit system for such articles.

BACKGROUND ART

Conventionally, various anticounterfeit labels have been developed for prevention of forgery of home electric appliances, electronic components, personal computer supplies, automobile parts, garments, accessories or various cards. Such an anticounterfeit label is used as an identification medium which is attached to objects which should be prevented from being forged, and determined visually or mechanically to verify the authenticity of the objects. Such known authenticity identifiers include a hologram, a liquid-crystalline film and the like and are introduced by, for example, Patent Literatures 1 to 6. The authenticity of an object which should be prevented from being forged, various cards and the like to which the authenticity identifier is attached is determined by directly reading the optical property of the authenticity identifier by a dedicated sensor.

As a method of visually determining the authenticity without using the dedicated sensor, there is, for example, a system as disclosed in Patent Literature 6. This system provides an authenticity identifier for reflecting only special light of a specific polarization component having a specific wavelength contained in natural light and a discrimination tool (hereinafter called a simple viewer) which is provided with two filters comprising a filter allowing the transmission of the special light and a filter not allowing the transmission. If a hologram image can be observed when the authenticity identifier is seen through the former filter and the hologram image cannot be observed but observed black when the identifier is seen through the latter, it can be judged easily that an article to which the identifier is attached is an authentic product and not a forged article. Thus, the determination of authenticity with the simple viewer directly contacted to the authenticity identifier which is attached to the article is very simple and effective means and its application is increasing.

Patent Literature 1: JP-A No. Sho 63-51193
Patent Literature 2: JP-A No. Hei 8-43804
Patent Literature 3: JP-A No. Hei 5-334477
Patent Literature 4: JP-A No. 2001-39100
Patent Literature 5: JP-A No. 2005-91786
Patent Literature 6: Pamphlet of International Publication No. 00/13065

SUMMARY OF THE INVENTION

Problems To Be Solved By the Invention

Meanwhile, many electronic components, electric components, automobile parts, garments, jewelry and the like are wrapped with a packaging material for prevention of breakage during transportation, prevention of contamination at shops, and various types of necessities such as designs and the like. A typical known packaging material is a blister pack formed by a molding process of a transparent plastic sheet.

In a case where the article to which attached is the authenticity identifier capable of determining the authenticity by using the above-described simple viewer is packaged in the above blister pack, the authenticity identifier attached to the article is observed by the simple viewer through the blister pack. But, there is an occurrence of a problem that the authenticity cannot be determined by the simple viewer when it is used to actually observe the authenticity identifier attached to the article packaged in the blister pack. Specifically, the simple viewer having two special filters can determine the authenticity based on a combination that a hologram image can be observed through one filter but not observed through the other. But, there are phenomena that it is not easily observable through either of the filters, it is observable through one filter through which a hologram image should not be observable and not observable through the other filter through which the hologram image should be observable, and the like. Therefore, usage of an anticounterfeit system using such an authenticity identifier is limited. It is tried to attach this authenticity identifier to the blister pack, but it is desirable to attach directly to the article in order for final confirmation, and a blister pack capable of conforming to the above anticounterfeit system is being demanded.

The present invention provides a transparent plastic container which is transparent, allows good design and can be used for an anticounterfeit system that determines authenticity by visual check with the use of polarization property.

Means For Solving the Problems

A first aspect of the present invention is a transparent plastic container for an anticounterfeit system, which contains an article having an authenticity identifier which reflects only a special light of a specific polarization component contained in natural light, wherein the plastic container is formed of a transparent plastic sheet having a total light transmission of 85% or more and a haze of 7% or less, and a planar portion of the plastic container has a strain amount of 150 nm or less.

The transparent plastic sheet is formed of a polystyrene-based resin or a polyvinyl chloride-based resin.

A second aspect of the present invention is a method for producing the transparent plastic container for an anticounterfeit system according to the first aspect of the present invention, wherein the transparent plastic sheet formed of a polystyrene-based resin having a total light transmission of 85% or more and a haze of 7% or less is subjected to vacuum, pneumatic or vacuum/pneumatic forming at a sheet temperature ranging from a glass transition temperature plus 50 degrees C. to a glass transition temperature plus 130 degrees C.

In the second aspect of the present invention, the polystyrene-based resin is preferably a composition comprising 20 to 100 wt % of a styrene-butadiene copolymer having a butadiene content of 30 wt % or below, 0 to 30 wt % of a styrene-butadiene copolymer having a butadiene content of 40 wt % or more, and 0 to 80 wt % of a styrene-(meth)acrylic ester copolymer.

A third aspect of the present invention is a method for producing the transparent plastic container for an anticounterfeit system according to the first aspect of the present invention, wherein a transparent plastic sheet formed of a polyvinyl chloride-based resin having a total light transmission of 85% or more and a haze of 7% or less is subjected to vacuum, pneumatic or vacuum/pneumatic forming at a sheet temperature ranging from a glass transition temperature plus 80 degrees C. to a glass transition temperature plus 130 degrees C.

Effects of the Invention

Since the transparent plastic container of the present invention finely transmits the light reflected from the authenticity identifier which is attached to the housed article, authenticity can be determined finely in the same manner as a case of the direct observation of the authenticity identifier even when the authenticity identifier is observed from outside through the transparent plastic container of the present invention, and the article can be prevented from being forged.

Explanation of Reference Numerals

| | |
|---|---|
| 1: | Transparent plastic container |
| 2: | Article |
| 3: | Authenticity identifier |
| 4: | Simple viewer |
| 11: | Reflective film |
| 11a: | Hologram-forming portion |
| 12: | Protective layer |
| 13: | Light-absorbing layer |
| 14: | Base film |
| 15: | Hologram-forming layer |
| 15a: | Hologram-forming portion |

BEST MODE FOR CARRYING OUT THE INVENTION

The present inventors have made devoted studies to find a blister pack compatible with an anticounterfeit system which applies an optical property to achieve the present invention. In other words, they have found that a transparent plastic container, which is formed of a transparent plastic sheet having a total light transmission of 85% or more and a haze of 7% or less and has a planar portion with a strain amount of 150 nm or less, is optimally usable for an anticounterfeit system using an authenticity identifier, and achieved the present invention.

The anticounterfeit system applied to the present invention is a system that determines authenticity by attaching an authenticity identifier, which reflects only special light of a specific polarization component contained in natural light, to a target article, and detecting the special light reflected by the authenticity identifier. For detection of the special light, a simple viewer provided with two filters comprising a filter allowing the transmission of the special light and a filter not allowing it is used. It can be determined by visual check that the target article is an authentic product if a hologram image can be observed through one filter but cannot be observed through the other filter and becomes black and it is a forged article if the hologram image is observed in a different form. Otherwise, the transmitted light quantity having transmitted through the simple viewer is detected electrooptically, and it can be determined from its difference whether or not the target article is an authentic product.

More specifically, the authenticity identifier described in Pamphlet of International Publication No. 00/13065 can be used. In other words, it is an authenticity identification film which is comprised of a reflective film which has circular polarized light selectivity to reflect only one of left circular polarized light or right circular polarized light in the incident light, and a hologram-forming portion which forms a hologram image by reflecting the circular polarized light which is same as or different from the light reflected from the reflective film in a direction different from the reflected light. The light containing the left circular polarized light and the right circular polarized light is irradiated to the film, and a visual check is performed through a simple viewer having two types of filters which allow the transmission of only the left circular polarized light and only the right circular polarized light, respectively. If a hologram image is visible through one of the filters but not visible through the other filter and becomes black, the target article is determined as an authentic product. And, a difference in the transmitted light quantity from the simple viewer can also be electrooptically detected to determine whether or not the target article is an authentic product according to the difference.

Figure 4:
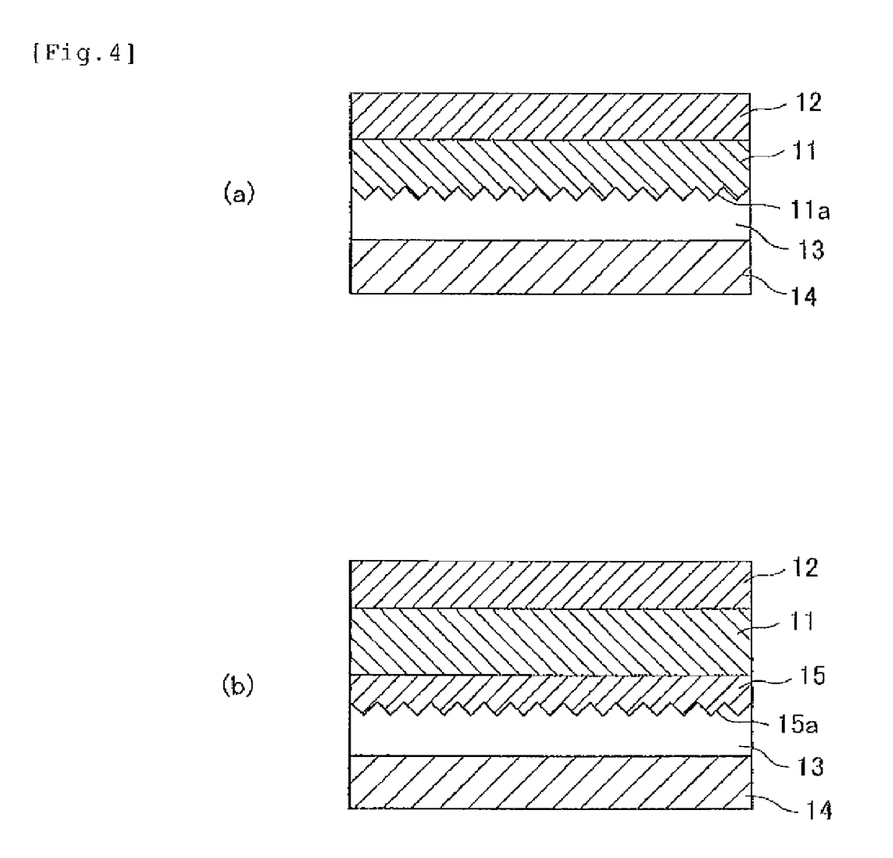
FIG. 4 A cross-sectional schematic view showing structures of the authenticity identifiers used in the present invention.

FIG. 4 shows a structure example of the authenticity identifier using the above-described circular polarized light. FIG. 4(a) is a cross-sectional schematic view of a structure example of forming a hologram image by reflecting the same circular polarized light as that reflected on the reflective film, and FIG. 4(b) is a cross-sectional schematic view of a structure example of forming a hologram image by reflecting the circular polarized light different from that reflected on the reflective film. In the drawings, 11 is a reflective film, 11a is a hologram-forming portion, 12 is a protective layer, 13 is a light-absorbing layer, 14 is a base film, 15 is a hologram-forming layer, and 15a is a hologram-forming portion.

In FIG. 4(a), the reflective film 11 is a layer which reflects only one of left circular polarized light and right circular polarized light in the incident light to generate the reflected light. And, the hologram-forming portion 11a is provided on the one-sided interface of the reflective film 11. The hologram-forming portion 11a forms a hologram image by reflecting the same circular polarized light as the light reflected from the reflective film 11 in a direction different from that of the reflected light. In other words, the reflective film 11 generates the reflected light by reflecting only one of the left circular polarized light and the right circular polarized light on the surface and within the layer of the protective layer 12 of the reflective film 11. The same light as the reflected light is further reached the hologram-forming portion 11a and reflected by the hologram-forming portion 11a in a direction different from that of the reflected light to form a hologram image.

In the structure of FIG. 4(b), the reflective film 11 reflects only one of the left circular polarized light and the right circular polarized light, and the hologram-forming layer 15 allows the transmission of the circular polarized light, which is opposite to the light reflected from the reflective film 11, to reflect at the hologram-forming portion 15a to form a hologram image.

In the structures of FIGS. 4(a), (b), a medium, which shows optically selective reflectivity and circular polarized light selectivity, such as a polymer film having cholesteric liquid crystal orientation fixed is used as the reflective film 11.

As the anticounterfeit system, a Trustgram (trade name, manufactured by NHK SPRING CO., LTD.) is commercially available.

In addition to the above, the present invention preferably uses the structure described in JP-A No. 2005-91786 or JP-A No. 2001-39100 that a nematic liquid crystal or a thermotropic liquid crystal is used to produce a partial phase difference and to determine through a polarization filter or a circular polarized light filter, and the structure described in JP-A No. 2003-73600 that a printed material printed with an ink containing cholesteric liquid crystal pigment is determined through the circular polarized light filter.

The total light transmission of the transparent plastic sheet referred to in the present invention indicates a value obtained by measuring a 1-mm thick sheet before forming according to JIS K7105, and the value must be 85% or more. If the total light transmission is less than 85%, a function of finely showing the inside product that is the biggest benefit as the blister pack is lost, and it is not preferable because a hologram image and a printed design become hardly visible.

The haze of the transparent plastic sheet indicates a value obtained by measuring a 1-mm thick sheet before being formed according to JIS K7105, and its value should be 7% or less. If the haze exceeds 7%, it is not preferable because a commercial value lowers similar to the total light transmission, and it becomes difficult to see a hologram image or a printed design which is an authenticity criterion.

The strain amount referred to in the present invention is also called retardation and known as a value of causing double refraction, which is an index of the optical property of a polymer material, and measured by a strain-meter (model No., for example, LSM-401) manufactured by Luceo Co., Ltd. The measured strain amount is divided by a thickness, and the result is generally known as double refraction. If there is double refraction, a phase difference is produced depending on a direction of the incident light, and polarization is changed. For example, the incident light of circular polarized light becomes elliptic polarized light, or the incident light of linearly polarized light becomes circular polarized light.

According to the present invention, a planar portion of the container has a strain amount of 150 nm or less, preferably 100 nm or less. If the strain exceeds 150 nm, it becomes impossible to determine the authenticity by means of a determination tool such as a simple viewer. Specifically, there is caused a problem that a hologram image is not observable through a filter through which the hologram image should be observed bright or recognizable, conversely observed bright or recognized through a filter through which the hologram image should be observed dark or not be observable, or recognized. Thus, it becomes undeterminable. There is also a problem that a determination device which electrooptically determines automatically becomes undeterminable similarly.

The planar portion of the container according to the present invention means a substantially flat portion, through which the authenticity identifier attached to an article can be observed externally. For example, the planar portion corresponds to a bottom or a side wall of a container having a box-like recessed portion for housing the article.

A production method of the present invention is described below. The above-described transparent plastic container of the present Invention can be formed by vacuum, pneumatic or vacuum/pneumatic forming. Such a method is known well as a blister pack container forming method.

The vacuum, pneumatic or vacuum/pneumatic forming generally forms by heating a plastic sheet to a softening point or higher. When a glass transition temperature is used as an index of the softening temperature, a low temperature is recommended if formable at the glass transition temperature or higher. For example, the recommended temperature is 140 degrees C. for a polystyrene-based resin and ABS resin, and about 120 degrees C. for a polyvinyl chloride-based resin.

But, the present invention sets the temperature of a plastic sheet at the time of forming to a level higher than the ordinary forming temperature. According to the present invention, the polystyrene-based resin or the polyvinyl chloride-based resin is preferably used. When the polystyrene-based resin is used, forming is performed at a glass transition temperature plus 50 degrees C. or higher, preferably 70 degrees C. or higher, and a glass transition temperature plus 130 degrees C. or lower. If the plastic sheet temperature is lower than the glass transition temperature plus 50 degrees C., the container has a planar portion with a strain amount of exceeding 150 nm, and it becomes hard to determine the authenticity. Meanwhile, if the plastic sheet temperature exceeds the glass transition temperature plus 130 degrees C., the drawdown becomes large at the time of forming, causing a problem that the vacuum/pneumatic forming is difficult, the forming time is unusually long, the sheet material itself is deteriorated, or the like.

The polyvinyl chloride-based resin is subjected to forming at a sheet temperature ranging from a glass transition temperature plus 80 degrees C. to a glass transition temperature plus 130 degrees C. If the sheet temperature is less than the glass transition temperature plus 80 degrees C., the container has a planar portion with a strain amount of exceeding 150 nm, and it becomes hard to determine the authenticity. Meanwhile, if it exceeds the glass transition temperature plus 130 degrees C., the drawdown becomes large at the time of forming, causing a problem that the vacuum/pneumatic forming is difficult, the forming time is unusually long, the sheet material itself is deteriorated, or the like.

The glass transition temperature referred to in the present invention means a value obtained by measuring by means of a differential scanning calorimeter (DSC) according to JIS K7121, for example, DSC-60 manufactured by Shimadzu Corporation. It is a value obtained by measuring at a temperature increase rate of 5 degrees C./minute at the time of DSC measurement in the present invention. In a case of a transparent plastic sheet showing plural glass transition temperatures, the glass transition temperature means a glass transition temperature which is most remarkably shown. The glass transition temperature also means a glass transition temperature of a sheet before forming.

As the transparent plastic sheet for the blister pack container, various types of transparent plastic materials are usable. As the general blister pack materials, there are a polyester-based resin, a polystyrene-based resin, and a polyvinyl chloride-based resin. The polystyrene-based resin and the polyvinyl chloride-based resin are preferably used in the present invention in view of the functions such as excellent optical property, strength and impact resistance as the blister pack, excellent cost performance as the packaging material, and low strain amount even after vacuum/pneumatic forming.

As the polystyrene-based resin used in the present invention, styrene homopolymer, styrene-(meth)acrylic ester copolymer, styrene-butadiene block copolymer and styrene-isoprene block copolymer are preferable. Especially, a polybutadiene or styrene-butadiene copolymer is used to form a disperse phase as an impact absorber, and transparent high-impact polystyrene having styrene-(meth)acrylic ester as a continuous phase is preferably applied. The (meth)acrylic ester includes methyl methacrylate, methyl acrylate, ethyl acrylate, propyl acrylate and n-butyl acrylate. Among them, methyl methacrylate and n-butyl acrylate are preferable and they may be used solely, but two or more of them may be used together. The (meth)acrylic ester content of the styrene-(meth)acrylic ester copolymer is preferably in a range of 8 to 20 wt %.

As the blister container which is further demanded to have impact resistance, copolymers having a high butadiene content as a styrene-based elastomer or their hydrogen additives, e.g., a styrene-ethylene-butylene elastomer can also be used in a range satisfying the optical property of the present invention as a part of the above-described styrene-butadiene block copolymer.

According to the present invention, a resin comprising 20 to 100 wt % of a styrene-butadiene copolymer having a butadiene content of 30 wt % or below, 0 to 30 wt % of a styrene-butadiene copolymer having a butadiene content of 40 wt % or more and 0 to 80 wt % of a styrene-(meth)alkyl acrylate copolymer is preferably used because a strain amount after molding is low, and as a blister pack, a balance between the transparency and impact resistance and the rigidity is excellent.

More preferably, a sheet formed of 20 wt % to 45 wt % of a styrene-(meth)acrylic ester copolymer, especially a copolymer using n-butyl acrylate and/or methyl methacrylate as the (meth)acrylic ester, 35 to 80 wt % of a styrene-butadiene block copolymer having a butadiene content of 30 wt % or below as the styrene-butadiene block copolymer, and 5 to 20 wt % of a styrene-butadiene copolymer having a butadiene content of 40 wt % or more as the styrene-butadiene block copolymer is preferably used from viewpoints of impact resistance, rigidity, transparency, low strain amount after forming and cost.

As the polyvinyl chloride-based resin used in the present invention, a rigid polyvinyl chloride resin is preferably used. To improve the impact resistance, an additive such as a plasticizer, a thermostabilizer or a lubricant is also added appropriately. According to the present invention, various types of additives such as resins, elastomers, thermostabilizers, dye and pigment can be added in an amount not degrading an optical property, an impact resistance and a low strain property after forming the blister pack.

According to the present invention, a raw sheet before forming, namely a transparent plastic sheet, has a thickness of 0.1 mm to 2.0 mm, preferably 0.3 mm to 1.8 mm, and when used as the blister pack after forming, the thickness is preferably in a range of 0.05 mm to 1.5 mm though variable depending on a container shape or locations. If the thickness is less than 0.05 mm, the blister pack has a problem in view of strength and rigidity. If the thickness exceeds 1.5 mm, it is not desirable in view of transparency, design and cost.

EXAMPLES

The present invention is specifically described below with reference to examples, but the present invention is not limited to the examples.

Example 1

Figure 1:
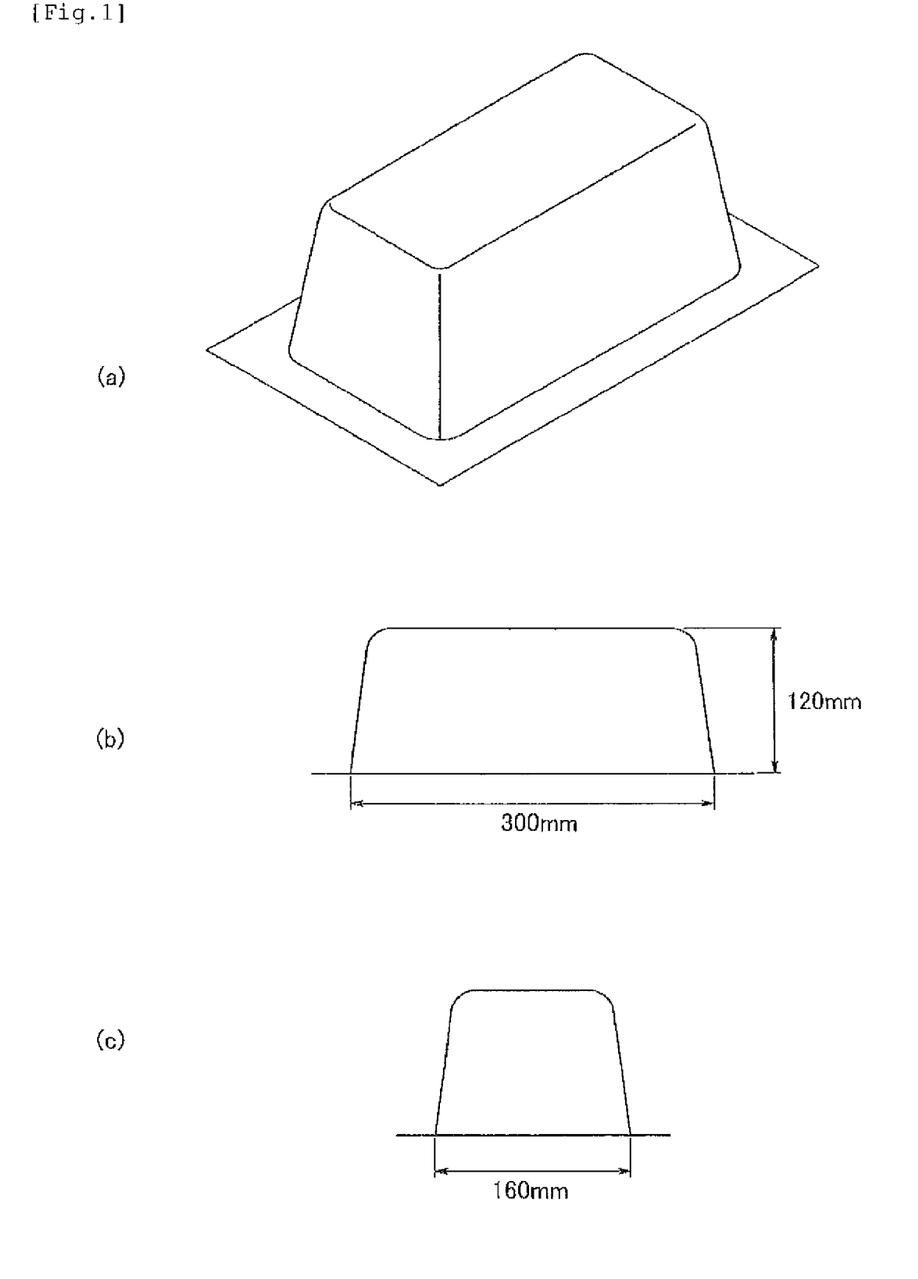
FIG. 1 A diagram showing a shape of a transparent plastic container of the present invention produced in an example of the present invention.

A composition comprising 30 wt % of a styrene-n-butyl acrylate copolymer (weight ratio of styrene/butyl acrylate: 90/10) and 70 wt % of a styrene-butadiene copolymer (weight ratio of styrene/butadiene: 78/22) was formed into a 1-mm thick sheet by means of a T-die extruder. The obtained sheet had a total light transmission of 90%, a haze of 5% and a glass transition temperature of 74 degrees C. The total light transmission and haze indicate the measured values of the 1 mm thick sheet according to JIS K7105. The glass transition temperature was measured by DSC-60 manufactured by Shimadzu Corporation at a temperature increase rate of 5 degrees C./minute according to JIS K7121. The sheet was formed into a box-like container 1 of 160 mm(W)×300 mm(L)×120 mm(H) shown in FIG. 1 by a vacuum molding machine (manufactured by Handa Sangyo). In FIG. 1, (a) is a perspective view, (b) is a front view, and (c) is a side view. A sheet temperature at the time of heating was measured by an infrared thermometer to find that it was 160 degrees C.

An optical strain amount of a position corresponding to the bottom of the container 1 was found to be 40 nm by measuring by a Strain-Meter (model No. LSM-401) manufactured by Luceo Co., Ltd.

Figure 2:
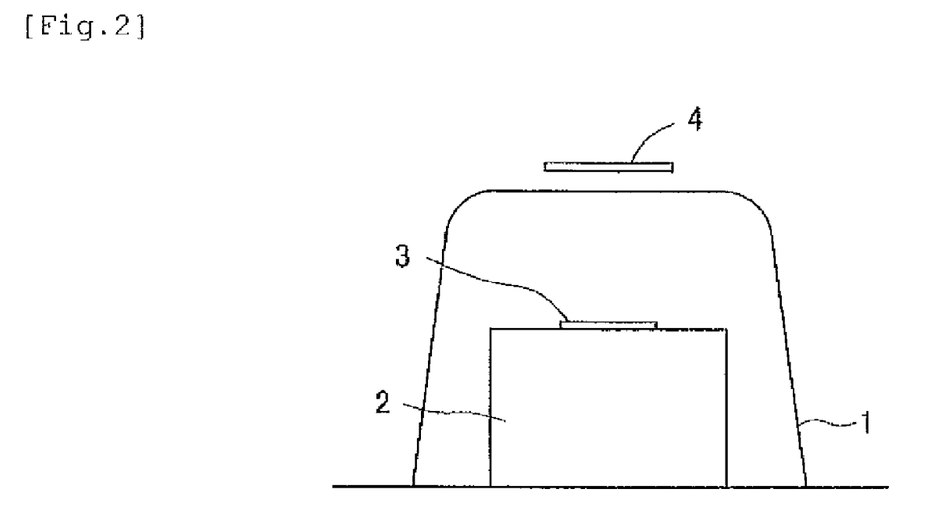
FIG. 2 A diagram showing a state that an article having an authenticity identifier is placed in a container of an example of the present invention.

As shown in FIG. 2, an article 2 to which "Trustgram TG-80" (trade name, manufactured by NHK SPRING CO., LTD.) was attached as an authenticity identifier 3 was placed in the obtained container 1. Then, a simple viewer 4 (TG-80 accessory, manufactured by NHK SPRING CO., LTD.) was arranged on the top of the container 1 as shown in FIG. 2. As a result, the Trustgram 3 could be clearly confirmed visually in a bright field through one filter of the simple viewer 4 and could not be confirmed in a dark field through the other filter. Thus, it was easily determined as an authentic product. The results are shown in Table 1.

Figure 3:
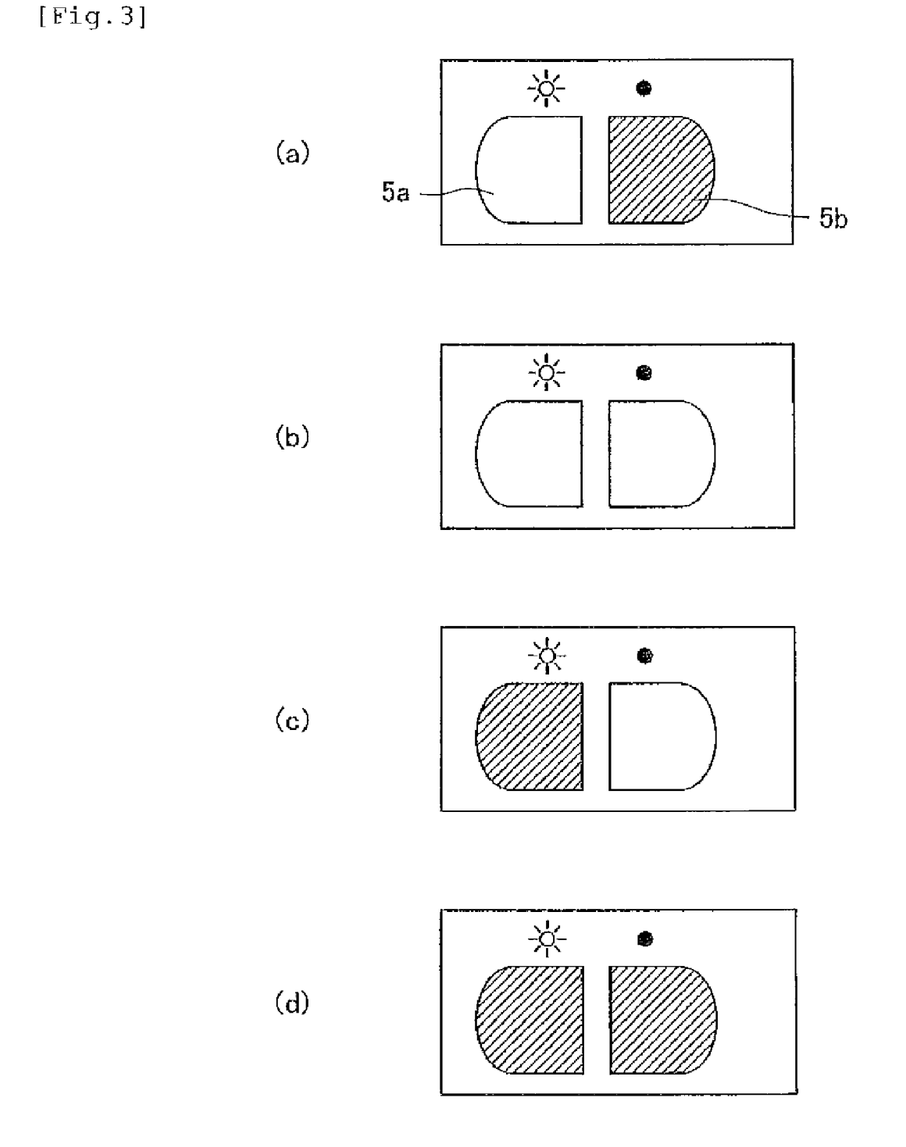
FIG. 3 A diagram showing authenticity criteria in an example of the present invention.

The simple viewer 4 is provided with two filters 5a, 5b as shown in FIG. 3. It is a system that determines an article to which the Trustgram is attached as an authentic product when the Trustgram can be authenticated clearly in the bright field through the filter 5a having a shiny mark and when the Trustgram cannot be observed in the dark field through the filter 5b having a black circle mark [FIG. 3(a)]. In this Example, it was indicated by ⊚ when it could be visually determined clearly as an authentic product by means of the simple viewer 4, ○ when it could be tentatively determined though obscure, and x when it could not be determined (visible through both the filters [FIG. 3(b)], invisible through both the filters [FIG. 3(d)] or inversely visible (invisible through the originally visible filter 5a but visible through the originally invisible filter 5b [FIG. 3(c)]).

Example 2

Measurement and judgment were performed in the same manner as in Example 1 excepting that the sheet temperature for the vacuum molding was set to 180 degrees C.

Example 3

A test was performed in the same manner as in Example 1 excepting that a commercially available 0.7-mm thick polyvinyl chloride sheet was used and the vacuum molding temperature was set to 190 degrees C. The results are shown in Table 1.

Example 4

A test was performed in the same manner as in Example 1 excepting that 50 wt % of a styrene-n-butyl acrylate copolymer and 50 wt % of a styrene-butadiene copolymer were used. The results are shown in Table 1.

Example 5

A test was performed in the same manner as in Example 1 excepting that the sheet compositions were changed to 25 wt % of a styrenenbutyl acrylate copolymer, 25 wt % of a styrene-methyl methacrylate copolymer (weight ratio of styrene/methyl methacrylate: 85/15) and 50 wt % of a styrene-butadiene copolymer (weight ratio of styrene/butadiene: 78/22), and the molding temperature was changed to 167 degrees C. The results are shown in Table 1.

Example 6

A test was performed in the same manner as in Example 1 excepting that the sheet materials of Example 1 were limited to the styrene-butadiene copolymer (weight ratio of styrene/butadiene: 75/25) only.

Example 7

A test was performed in the same manner as in Example 1 excepting that the sheet materials of Example 1 were changed to 10 wt % of a styrene homopolymer, 20 wt % of a styrene-n-butyl acrylate copolymer and 70 wt % of a styrene-butadiene copolymer (weight ratio of styrene/butadiene: 70/30), and the molding temperature was changed to 170 degrees C.

Example 8

A test was performed in the same manner as in Example 1 excepting that the sheet material compositions were changed to 30 wt % of a styrene-n-butyl acrylate copolymer, 10 wt % of a styrene-butadiene copolymer-1 (weight ratio of styrene/butadiene: 40/60) and 60 wt % of a styrene-butadiene copolymer-2 (weight ratio of styrene/butadiene: 77/23).

Example 9

A test was performed in the same manner as in Example 1 excepting that the sheet material compositions were changed to 20 wt % of a styrene-n-butyl acrylate copolymer (weight ratio of styrene/butyl acrylate: 90/10), 10 wt % of a styrenemethyl methacrylate copolymer (weight ratio of styrene/methyl methacrylate: 85/15), 10 wt % of a styrene-butadiene copolymer-1 (weight ratio of styrene/butadiene: 40/60) and 60 wt % of a styrene-butadiene copolymer-2 (weight ratio of styrene/butadiene: 77/23), and the molding temperature was changed to 170 degrees C.

Example 10

A test was performed in the same manner as in Example 1 excepting that the sheet material compositions were changed to 30 wt % of a styrene-methyl methacrylate copolymer (weight ratio of styrene/methyl methacrylate: 85/15), 10 wt % of a styrene-butadiene copolymer-1 (weight ratio of styrene/butadiene: 40/60) and 60 wt % of a styrene-butadiene copolymer-2 (weight ratio of styrene/butadiene: 77/23), and the molding temperature was changed to 180 degrees C.

Example 11

A test was performed in the same manner as in Example 1 excepting that the sheet forming material compositions were changed to 30 wt % of a styrene-methyl methacrylate-n-butyl acrylate copolymer (weight ratio of styrene/methyl methacrylate/n-butyl acrylate: 88/8/4), 10 wt % of styrene-butadiene copolymer-1 (weight ratio of styrene/butadiene: 40/60) and 60 wt % of styrene-butadiene copolymer-2 (weight ratio of styrene/butadiene: 77/23), and the molding temperature was changed to 160 degrees C.

Comparative Example 1

A test was performed in the same manner as in Example 1 excepting that the sheet temperature at the time of vacuum molding was changed to 120 degrees C. The results are shown in Table 1.

Comparative Example 2

A test was performed in the same manner as in Example 3 excepting that the sheet temperature at the time of vacuum molding was changed to 150 degrees C. The results are shown in Table 1.

Comparative Example 3

A test was performed in the same manner as in Example 4 excepting that the sheet temperature at the time of vacuum molding was changed to 125 degrees C.

Comparative Example 4

A test was performed in the same manner as in Example 8 excepting that the sheet temperature at the time of vacuum molding was changed to 125 degrees C.

Comparative Example 5

A test was performed in the same manner as in Example 1 excepting that the temperature at the time of vacuum molding was changed to 205 degrees C. As a result, drawdown was large at the time of vacuum molding, and a good molded body could not be obtained.

Comparative Example 6

A test was performed in the same manner as in Example 3 excepting that the temperature at the time of vacuum molding was changed to 210 degrees C. As a result, drawdown was large, and molding was difficult. The obtained product had considerably lowered impact strength and was not usable as a blister pack container.

Comparative Examples 7 to 9

A test was performed in the same manner as in Example 1 excepting that a commercially available 1-mm thick polyester sheet was used, the temperature at the time of vacuum molding was changed to 126 degrees C., 136 degrees C., and 150 degrees C. The results are shown in Table 1. At the temperature of 150 degrees C. or higher, crystallization of the polyester sheet was started, a vacuum molding property was lowered, shaping became difficult, transparency was lowered, and the product was unusable as a blister pack.

TABLE 1

| | Sheet material | Total light transmission | Haze | Glass transition temperature (degree C.) | Molding temperature (degree C.) | Strain (nm) | Trustgram determination |
|---|---|---|---|---|---|---|---|
| Example 1 | Styrene-n-butyl acrylate copolymer: 30 wt %<br>Styrene-butadiene copolymer: 70 wt % | 90 | 5 | 74 | 160 | 40 | ⊚ |
| Example 2 | Styrene-n-butyl acrylate copolymer: 30 wt %<br>Styrene-butadiene copolymer: 70 wt % | 90 | 5 | 74 | 180 | 10 | ⊚ |
| Example 3 | Polyvinyl chloride | 88 | 4 | 77 | 190 | 90 | ○ |
| Example 4 | Styrene-n-butyl acrylate copolymer: 50 wt %<br>Styrene-butadiene copolymer: 50 wt % | 87 | 6 | 76 | 160 | 50 | ○ |

TABLE 1-continued

|  | Sheet material | Total light transmission | Haze | Glass transition temperature (degree C.) | Molding temperature (degree C.) | Strain (nm) | Trustgram determination |
|---|---|---|---|---|---|---|---|
| Example 5 | Styrene-methyl methacrylate copolymer: 25 wt %<br>Styrene-n-butyl acrylate copolymer: 25 wt %<br>Styrene-butadiene copolymer: 50 wt % | 86 | 6.5 | 97 | 167 | 95 | ○ |
| Example 6 | Styrene-butadiene copolymer: 100 wt % | 90 | 3 | 89 | 160 | 60 | ○ |
| Example 7 | Styrene homopolymer: 10 wt %<br>Styrene-n-butyl acrylate copolymer: 20 wt %<br>Styrene-butadiene copolymer: 70 wt % | 89 | 6.4 | 78 | 170 | 80 | ○ |
| Example 8 | Styrene-n-butyl acrylate copolymer: 30 wt %<br>Styrene-butadiene copolymer-1: 10 wt %<br>Styrene-butadiene copolymer-2: 60 wt % | 90 | 4 | 74 | 160 | 20 | ◉ |
| Example 9 | Styrene-methyl methacrylate copolymer: 10 wt %<br>Styrene-n-butyl acrylate copolymer: 20 wt %<br>Styrene-butadiene copolymer-1: 10 wt %<br>Styrene-butadiene copolymer-2: 60 wt % | 90 | 5 | 80 | 170 | 30 | ◉ |
| Example 10 | Styrene-methyl methacrylate copolymer: 30 wt %<br>Styrene-butadiene copolymer-1: 10 wt %<br>Styrene-butadiene copolymer-2: 60 wt % | 90 | 4 | 98 | 180 | 25 | ◉ |
| Example 11 | Styrene-methyl methacrylate-n-butyl acrylate copolymer: 30 wt %<br>Styrene-butadiene copolymer-1: 10 wt %<br>Styrene-butadiene copolymer-2: 60 wt % | 91 | 3 | 84 | 160 | 20 | ◉ |
| Comparative Example 1 | Styrene-n-butyl acrylate copolymer: 30 wt %<br>Styrene-butadiene copolymer: 70 wt % | 90 | 5 | 74 | 120 | 170 | X |
| Comparative Example 2 | Polyvinyl chloride | 88 | 4 | 77 | 150 | 160 | X |
| Comparative Example 3 | Styrene-n-butyl acrylate copolymer: 50 wt %<br>Styrene-butadiene copolymer: 50 wt % | 87 | 6 | 76 | 125 | 185 | X |
| Comparative Example 4 | Styrene-n-butyl acrylate copolymer: 30 wt %<br>Styrene-butadiene copolymer-1: 10 wt %<br>Styrene-butadiene copolymer-2: 60 wt % | 90 | 4 | 74 | 125 | 170 | X |
| Comparative Example 5 | Styrene-n-butyl acrylate copolymer: 30 wt %<br>Styrene-butadiene copolymer: 70 wt % | 90 | 5 | 74 | 205 | — | — |
| Comparative Example 6 | Polyvinyl chloride | 88 | 4 | 77 | 210 | — | — |
| Comparative Example 7 | Polyester resin | 89 | 2 | 76 | 126 | 200 or more | X |
| Comparative Example 8 | Polyester resin | 89 | 2 | 76 | 136 | 200 or more | X |
| Comparative Example 9 | Polyester resin | 89 | 2 | 76 | 150 | 200 or more | X |

The invention claimed is:

1. A transparent plastic container for an anticounterfeit system, which contains an article having a hologram as an authenticity identifier which reflects only a special light of a specific polarization component contained in natural light, wherein
the plastic container is formed of a transparent plastic sheet having a total light transmission of 85% or more and a haze of 7% or less, and a planar portion of the plastic container has a strain amount of 150 nm or less, and
the transparent plastic sheet is formed of a polystyrene-based resin or a polyvinyl chloride-based resin.

2. A method for producing the transparent plastic container for an anticounterfeit system according to claim 1, wherein the transparent plastic sheet formed of a polystyrene-based resin having a total light transmission of 85% or more and a haze of 7% or less is subjected to vacuum, pneumatic or vacuum/pneumatic forming at a sheet temperature ranging from a glass transition temperature plus 50 degrees C. to a glass transition temperature plus 130 degrees C.

3. The method for producing the transparent plastic container for an anticounterfeit system according to claim 2, wherein the polystyrene-based resin is a composition comprising 35 to 80 wt % of a styrene-butadiene copolymer having a butadiene content of 22 to 30 wt %, 5 to 20 wt % of a styrene-butadiene copolymer having a butadiene content of 40 wt % or more, and 20 to 50 wt % of a styrene-(meth) acrylic ester copolymer.

4. A method for producing the transparent plastic container for an anticounterfeit system according to claim 1, wherein a transparent plastic sheet formed of a polyvinyl chloride-based resin having a total light transmission of 85% or more and a haze of 7% or less is subjected to vacuum, pneumatic or vacuum/pneumatic forming at a sheet temperature ranging from a glass transition temperature plus 80 degrees C. to a glass transition temperature plus 130 degrees C.

5. The transparent plastic container for an anticounterfeit system according to claim 1, wherein the transparent plastic container is obtained by vacuum, pneumatic or vacuum/pneumatic forming the transparent plastic sheet formed of a polystyrene-based resin at a sheet temperature ranging from a glass transition temperature plus 50 degrees C. to a glass transition temperature plus 130 degrees C.

6. The transparent plastic container for an anticounterfeit system according to claim 1, wherein the transparent plastic container is obtained by vacuum, pneumatic or vacuum/pneumatic forming the transparent plastic sheet formed of a polyvinyl chloride-based resin at a sheet temperature ranging from a glass transition temperature plus 80 degrees C. to a glass transition temperature plus 130 degrees C.

* * * * *